United States Patent
Chen

(10) Patent No.: US 10,677,601 B2
(45) Date of Patent: Jun. 9, 2020

(54) METHOD, ELECTRONIC DEVICE, AND COMPUTER-READABLE RECORDING MEDIUM FOR PLANNING A MEETING POINT AND ROUTES

(71) Applicant: Wistron Corporation, New Taipei (TW)

(72) Inventor: Xin Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 112 days.

(21) Appl. No.: 15/844,635

(22) Filed: Dec. 18, 2017

(65) Prior Publication Data
US 2018/0356240 A1 Dec. 13, 2018

(30) Foreign Application Priority Data
Jun. 9, 2017 (CN) .......................... 2017 1 0433824

(51) Int. Cl.
*G01C 21/34* (2006.01)
*G01C 21/36* (2006.01)

(52) U.S. Cl.
CPC ..... *G01C 21/3438* (2013.01); *G01C 21/3415* (2013.01); *G01C 21/3676* (2013.01)

(58) Field of Classification Search
CPC ............ G01C 21/3438; G01C 21/3415; G01C 21/3676
See application file for complete search history.

(56) References Cited

U.S. PATENT DOCUMENTS

| 2007/0118415 | A1 | 5/2007 | Chen et al. |
| 2008/0231507 | A1* | 9/2008 | Burckart ................ G01C 21/20 342/357.52 |
| 2010/0076951 | A1 | 3/2010 | Lyle et al. |
| 2010/0323722 | A1* | 12/2010 | Hatami .................... H04W 4/21 455/456.3 |

(Continued)

FOREIGN PATENT DOCUMENTS

| TW | I557681 | 11/2016 |
| WO | 2016040572 | 3/2016 |

OTHER PUBLICATIONS

"Office Action of Taiwan Counterpart Application," dated Feb. 1, 2018, p. 1-p. 7.

(Continued)

*Primary Examiner* — Aaron L Troost
(74) *Attorney, Agent, or Firm* — JCIPRNET

(57) ABSTRACT

A method, an electronic device and a computer-readable recording medium for planning a meeting point and routes are provided, and the method including the following steps. Map information and a start point location of each of a plurality of user terminals are obtained. Prior planning information associated with the start point location is generated for each of the user terminals according to the map information. A best meeting point is determined for the user terminals according to the prior planning information. During a period in which at least one of the user terminals performs a navigation operation according to a navigation route, the best meeting point and the navigation route of at least one of the user terminals are dynamically adjusted according to a moving state of each of the user terminals and the prior planning information.

26 Claims, 6 Drawing Sheets

(56) References Cited

U.S. PATENT DOCUMENTS

| | | | |
|---|---|---|---|
| 2011/0113148 A1* | 5/2011 | Salmela | G01C 21/3438 |
| | | | 709/229 |
| 2014/0310266 A1 | 10/2014 | Greenfield | |
| 2014/0358437 A1* | 12/2014 | Fletcher | G01C 21/3617 |
| | | | 701/533 |
| 2016/0073223 A1 | 3/2016 | Woolsey et al. | |
| 2017/0284817 A1* | 10/2017 | Greenspan | G01C 21/3492 |
| 2018/0149484 A1* | 5/2018 | Baer | G01C 21/3438 |

OTHER PUBLICATIONS

"Office Action of China Counterpart Application", dated Mar. 5, 2020, p. 1-p. 10.

* cited by examiner

METHOD, ELECTRONIC DEVICE, AND COMPUTER-READABLE RECORDING MEDIUM FOR PLANNING A MEETING POINT AND ROUTES

CROSS-REFERENCE TO RELATED APPLICATION

This application claims the priority benefit of China application serial no. 201710433824.1, filed on Jun. 9, 2017. The entirety of the above-mentioned patent application is hereby incorporated by reference herein and made a part of this specification.

BACKGROUND OF THE DISCLOSURE

Technique Field

The disclosure relates to a method for providing a meeting point for a plurality of user terminals, and in particular, a method, an electronic device, and a computer-readable recording medium for planning a meeting point and routes.

Description of Related Art

With the advance of technology and the development of transports, the travels made by modern people (e.g., freight transportation, logistics, leisure activities, and tourism) have significantly increased. At this time, direction indication or map guidance becomes indispensable information. Currently, navigation devices are built-in with smart electronic maps and have route planning and navigation functions. A user only needs to input a desired destination into the navigation device, and the navigation device will plan a navigation route and emit voice messages to guide the user to move towards the destination according to the planned navigation route. As modern cities grow bigger and bigger, there are more and more transportation means and roads, and people become more and more reliant on the navigation function.

However, the assistance provided by the current navigation devices is limited to one single user end. In other words, the navigation devices can only plan a route for one single user end with a confirmed end point. Therefore, when a plurality of users would like to meet each other at a meeting point, the users need to negotiate over one meeting point in advance. Next, the users need to respectively input the meeting point into the navigation devices, and then respectively move to the meeting point through following the navigation routes suggested by the navigation devices. Accordingly, once the decision on the meeting point is undesirable, the users closer to the meeting point will need to wait for the users farther from the meeting point to arrive at the meeting point for a long time. Moreover, once one of the users takes the wrong path on the way to the meeting point, it will take the user end that takes the wrong path more time to arrive at the meeting point, and the other users will unknowingly continue to move towards the decided meeting point. In other words, confined by the fixed meeting point generated based on the users' own decision, the users generally fail to meet with each other in a most efficient manner.

SUMMARY

In light of the above, the disclosure provides a method, an electronic device, and a computer-readable recording medium for planning a meeting point and routes that determine a best meeting point and provide navigation routes according to map information and moving states and locations of a plurality of user terminals, such that the user of the user terminals can meet with each other at the best meeting point in a more efficient manner.

In an embodiment of the disclosure, the method for planning a meeting point and routes includes the following steps: obtaining map information and a start point location of each of a plurality of user terminals; generating previous planning information associated with the start point location for each of the user terminals according to the map information; determining a best meeting point for the user terminals according to the previous planning information; and dynamically adjusting the best meeting point and a navigation route of at least one of the user terminals according to a moving state of each of the user terminals and the previous planning information, during a period in which at least one of the user terminals performs a navigation operation according to the navigation route.

In an embodiment of the disclosure, the electronic device for planning a meeting point and routes includes a memory and a processor. The memory records a plurality of modules, and the processor is coupled to the memory to access and execute the modules recorded in the memory. The modules include an information acquisition module, a planning module, a decision module, and a dynamic adjustment module. The information acquisition module obtains map information and a start point location of each of a plurality of user terminals. The planning module generates previous planning information associated with the start point location for each of the user terminals according to the map information. The decision module determines a best meeting point for the user terminals according to the previous planning information. The dynamic adjustment module dynamically adjusts the best meeting point and a navigation route of at least one of the user terminals according to a moving state of each of the user terminals and the previous planning information, during a period in which at least one of the user terminals performs a navigation operation according to the navigation route.

A computer-readable recording medium includes a plurality of commands configured to execute a method for planning a meeting point and routes. The method includes the following steps: obtaining map information and a start point location of each of a plurality of user terminals; generating previous planning information associated with the start point location for each of the user terminals according to the map information; determining a best meeting point for the user terminals according to the previous planning information; and dynamically adjusting the best meeting point and a navigation route of at least one of the user terminals according to a moving state of each of the user terminals and the previous planning information, during a period in which at least one of the user terminals performs a navigation operation according to the navigation route.

In light of the above, in the embodiments of the disclosure, by generating the previous planning information, the best meeting point is determined based on the start point locations of each of the user terminals before the navigation function is started, such that it takes the user terminals the least time to get to meet with each other. In addition, after the navigation function is started, the best meeting point and the navigation routes are dynamically adjusted according to the moving states of the user terminals. Accordingly, even if any of users takes the wrong path, the method, the electronic device, and the computer-readable recording medium for planning a meeting point and routes of the disclosure can adaptively provide another best meeting point according to the previous planning information, such that the users of the user terminals can meet with each other in a more efficient manner.

To provide a further understanding of the aforementioned and other features and advantages of the disclosure, exemplary embodiments, together with the reference drawings, are described in detail below.

DESCRIPTION OF THE EMBODIMENTS

Figure 1:
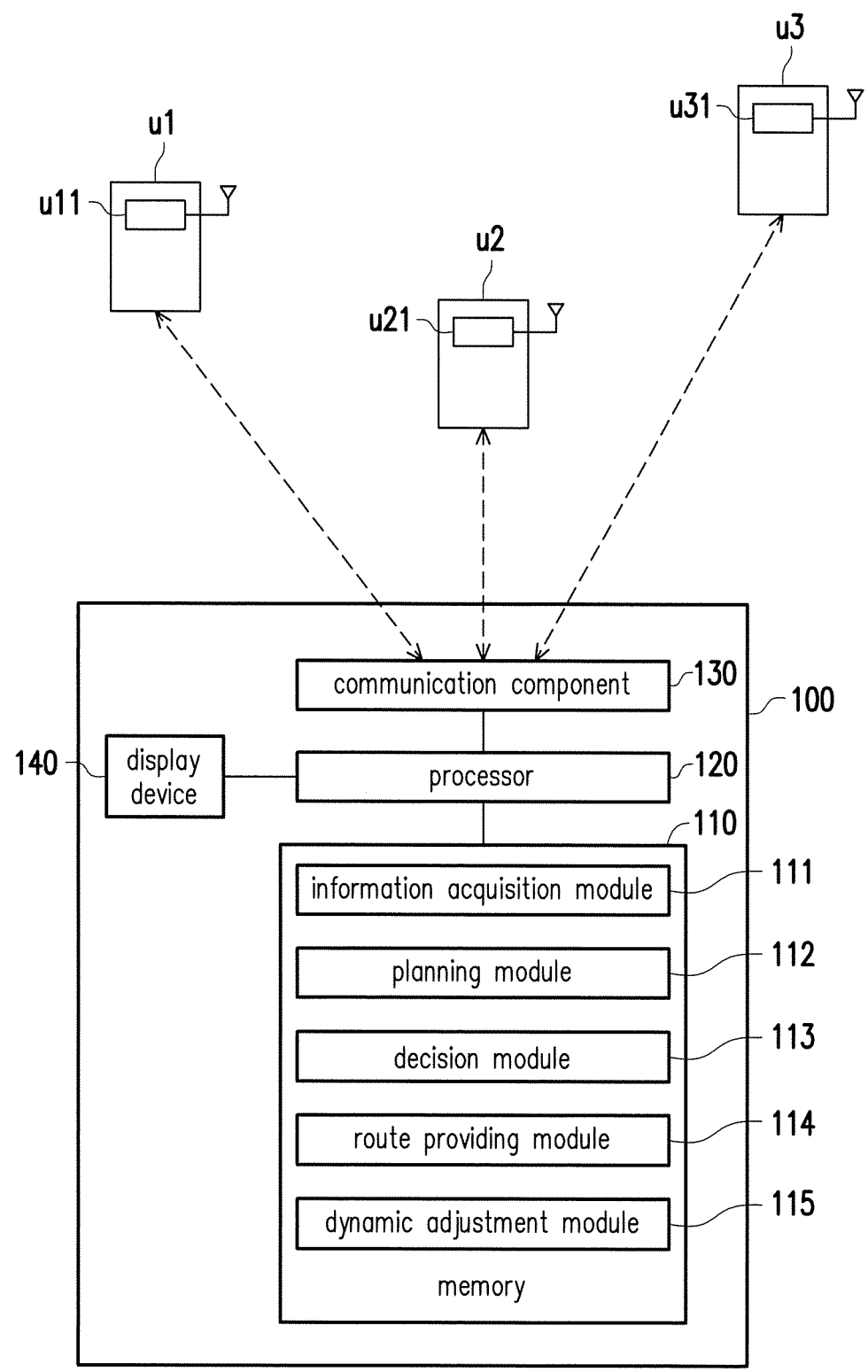
FIG. 1 is a schematic diagram illustrating an electronic device for planning a meeting point and routes according to an embodiment of the disclosure.

Some embodiments of the disclosure will next be detailed with reference to the accompanying drawings. The reference numerals used in the description below will be seen as referring to the same or similar components when the same reference numerals appear in different drawings. The embodiments only form part of the disclosure and do not disclose all of the embodiments that can be implemented by the disclosure. More specifically, the embodiments are only examples of a method, an electronic device, and a computer-readable recording medium in the claims of the disclosure.

FIG. 1 is a schematic diagram illustrating an electronic device for planning a meeting point and routes according to an embodiment of the disclosure, which is merely meant to facilitate description and is not meant to limit the disclosure. First, FIG. 1 introduces all components of the electronic device and their configuration relations. Their detailed functions will be disclosed with reference to FIG. 2.

Referring to FIG. 1, an electronic device 100 includes a memory 110, a processor 120, and a communication component 130, wherein the processor 120 is coupled to a display device 140, the communication component 130, and the memory 110. In the present embodiment, the electronic device 100 is, for example, a computer system having computational capacity, such as an application server, a cloud server, a database server, a workstation, etc. Moreover, the electronic device 100 may also be a computer apparatus having computational capacity, such as a desktop computer, a laptop, a smartphone, etc. It is noted that in an embodiment, the electronic device 100 may also be implemented in more than one electronic device, and the disclosure is not limited hereto.

The communication component 130 is configured to provide the electronic device 100 with connection to other devices and is, for example, an electronic component such as a wireless network communication chip or an antenna of the WiMAX communication protocol, Wi-Fi communication protocol, 2G communication protocol, 3G communication protocol, or 4G communication protocol. Alternatively, the communication component 130 may be a wired data transmission interface, such as an Ethernet network component, a USB interface component, etc. The electronic device 100 directly or indirectly transmits data to a plurality of user terminals (e.g., a user end u1, a user end u2, and a user end u3) via the communication component 130, or directly or indirectly receives data from the plurality of user terminals via the communication component 130.

The display device 140 is, for example, a liquid crystal display (LCD), a light-emitting diode (LED) display, a field emission display (FED), or a display of another type, but is not limited hereto. Alternatively, the display device 140 may also be a display screen of an integrated touch detection component that simultaneously provides display and input functions. Alternatively, the display device 140 may also be a projection display device. The display device 140 displays an electronic map and further displays a best meeting point and navigation routes on the electronic map.

The memory 130 is configured to store information such as data and program codes, and is, for example, a fixed or removable random access memory (RAM), read-only memory (ROM), flash memory, hard disc of any form, or another similar device, integrated circuit, or a combination thereof.

The processor 120 is configured to control actuations between the components of the electronic device 100, and is, for example, a central processing unit (CPU) or another programmable general-purpose or specific-purpose microprocessor, digital signal processor (DSP), programmable controller, application specific integrated circuit (ASIC), programmable logic device (PLD), application processor (AP), another similar device, or a combination of these devices. The processor 120 is coupled to the memory 110 and can access and execute modules and various programs recorded in the memory 110.

In the present embodiment, the modules in the memory 110 at least include an information acquisition module 111, a planning module 112, a decision module 113, a route providing module 114, and a dynamic adjustment module 115. These modules are, for example, computer programs, software program, instructions, or commands that load into the processor 120 to cause the electronic device 100 to execute the method for planning a meeting point and routes for the plurality of user terminals. Embodiments will be provided below with reference to the components of the electronic device 100 of FIG. 1 to describe the detailed steps of the electronic device 100 executing the method thereof.

Figure 2:
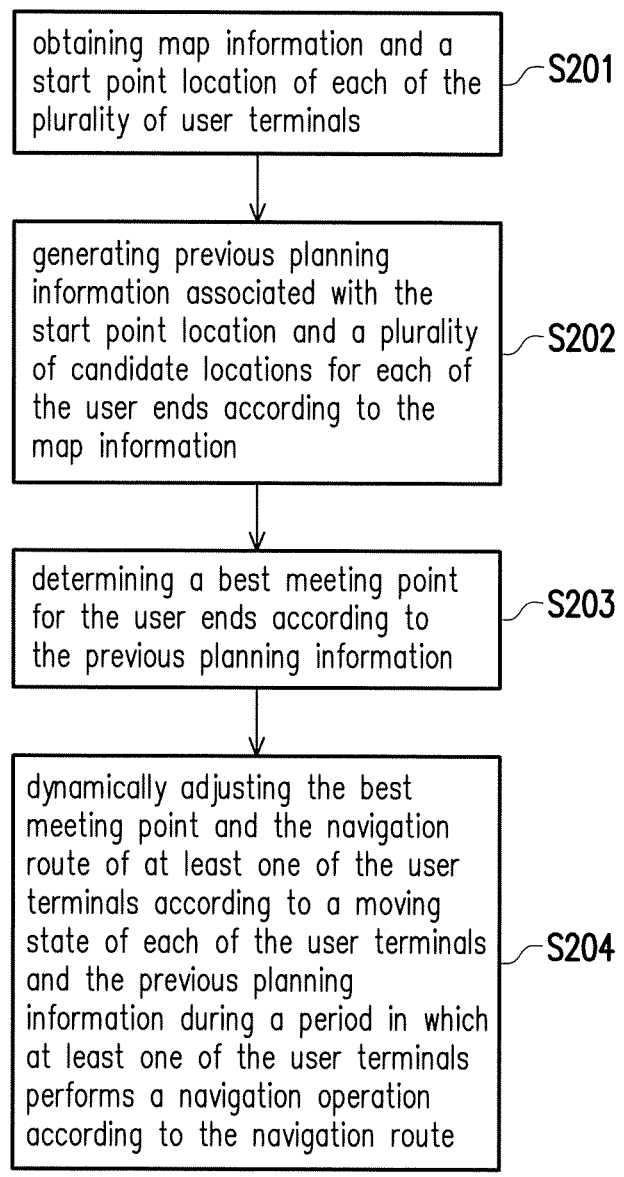
FIG. 2 is a flowchart illustrating a method for planning a meeting point and routes according to an embodiment of the disclosure.

FIG. 2 is a flowchart illustrating a method for planning a meeting point and routes according to an embodiment of the disclosure. Embodiments will be provided below with reference to the components of the electronic device 100 of FIG. 1 to describe the detailed steps of the electronic device 100 executing the method for planning a meeting point and routes.

Referring to both FIG. 1 and FIG. 2, in step S201, the information acquisition module 111 obtains map information and a start point location of each of the plurality of user terminals. Specifically, taking the three user terminals u1, u2, u3 of FIG. 1 as an example, each of the user terminals respectively has positioning components u11, u21, u31. The user terminals u1, u2, u3 are, for example, mobile phones, tablet computers, navigation systems, laptops, etc., and the positioning components u11, u21, u31 are, for example, GPS positioning components, but the disclosure is not limited hereto. The positioning components u11, u21, u31 respectively obtain locations of the user terminals through positioning techniques. In other words, when operators of the user terminals u1, u2, u3 start to use a function of planning a meeting point and routes, the user terminals u1, u2, u3 respectively report the start point locations obtained by the positioning components u11, u21, u31 to the electronic device 100. It is noted that the number of the user terminals is at least 2. Although FIG. 1 illustrates three user terminals as an example, the number of the user terminals is not limited in the disclosure.

Moreover, the information acquisition module 111 reads map information stored in advance in the memory 110 or downloads the map information from a map server. The map information includes road information, traffic information, landmark information, etc. For example, the information acquisition module 111 obtains the map information from the map service server established by Google via the communication component 130.

Then, in step S202, according to the map information, the planning module 112 generates previous planning information associated with the start point location and a plurality of candidate locations for each of the user terminals. Specifically, the candidate locations are, for example, all or part of road intersections within a predetermined range on the electronic map, or other marked locations on the electronic map. In an embodiment, the planning module 112 plans the predetermined range according to the start point locations of each of the user terminals, and then selects the candidate locations within the predetermined range. Accordingly, the planning module 112 generates the previous planning information associated with the start point location and the candidate locations specifically for each of the user terminals according to the map information, and stores the previous planning information in the memory 110. The previous planning information includes an estimated time required for each of the user terminals to move from the start point location to each of the candidate locations, an estimated time required for each of the user terminals to move from one of the candidate locations to other candidate locations, a topological model formed by the candidate locations and the start point location, etc.

Figure 3:
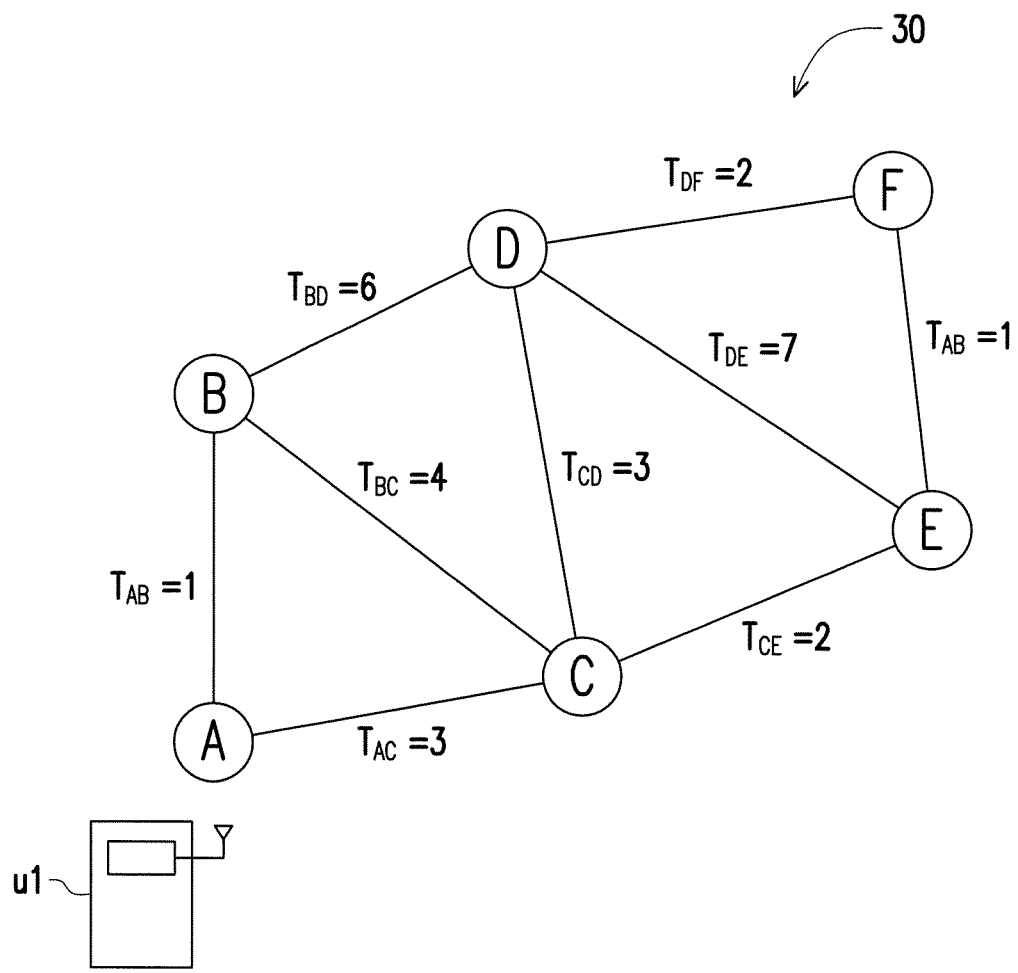
FIG. 3 is a schematic diagram illustrating a topological model according to an embodiment of the disclosure.

For example, FIG. 3 is a schematic diagram illustrating a topological model according to an embodiment of the disclosure. Referring to FIG. 3, it is supposed that the user end u1 starts from a start point location A, and the planning module 112 generates a topological model 30 for the user end u1 according to the map information. The topological model 30 includes the start point location A of the user end u1 and a plurality of candidate locations B, C, D, E, F. Based on a moving speed of the user end u1 and the traffic information, the planning module 112 estimates an estimated time $T_{AB}$ required for moving from the start point location A to the candidate location B. Similarly, the planning module 112 estimates an estimated time $T_{AC}$ required for moving from the start point location A to the candidate location C. Moreover, based on the moving speed of the user end u1 and the traffic information, the planning module 112 also estimates an estimated time $T_{BD}$ required for the user end u1 to move from the candidate location B to the candidate location D, and so on.

Accordingly, the planning module 112 establishes connecting paths between each of the candidate locations B, C, D, E, F and the start point location A in the topological model 30 and the estimated times thereof according to the road information and the traffic information. For example, the planning module 112 connects the start point location A and the candidate location B according to the road information, and estimates that the estimated time $T_{AB}$ required for the user end u1 to move between the start point location A and the candidate location B is equal to 1 time unit ($T_{AB}$=1) according to the traffic information. Then, the planning module 112 stores both the topological model 30 and relevant information including the connecting paths and the estimated times thereof in the memory 110. Similarly, the planning module 112 also generates topological models and relevant information thereof for the user terminals u2, u3 according to the map information, and stores the topological models and the relevant information thereof associated with the user terminals u2, u3 in the memory 110.

Returning to FIG. 2, after generating and storing the previous planning information, in step S203, according to the previous planning information, the decision module 113 determines a best meeting point for the user terminals. In an embodiment, the previous planning information already records a plurality of candidate locations and estimated times required for each of the user terminals to move to the candidate locations. Therefore, by comparing the times required for each of the user terminals to move to the candidate locations one by one and screening them, the decision module 113 determines the best meeting point among the candidate locations. Alternatively, in an embodiment, the decision module 113 determines the best meeting point by using maximal travel sets of each of the user terminals with respect to different time points in the previous planning information, and the maximal travel sets with respect to different time points are sets of the candidate locations at which each of the user terminals is able to arrive within different travel times.

Afterwards, in step S204, during a period in which at least one of the user terminals performs a navigation operation according to a navigation route, the dynamic adjustment module 115 dynamically adjusts the best meeting point and the navigation route of one of the user terminals according to a moving state of each of the user terminals and the previous planning information. In an embodiment, after determining the best meeting point, at least one of the user terminals u1, u2, u3 obtains the corresponding navigation route, which is a route planned with the best meeting point as an end point. In other words, after the electronic device 100 respectively provides the navigation routes to the corresponding user terminals, at least one of the user terminals performs the navigation operation according to the assigned navigation route. For example, the screens of the electronic device 100 and the user terminals u1, u2, u3 display an electronic map, on which the assigned navigation routes and the best meeting point are marked and indicated. During the period in which the user terminals u1, u2, u3 perform the navigation operation according to the navigation routes, the user terminals u1, u2, u3 provide prompt messages according to the navigation routes for assisting the users to move to the best meeting point.

It is particularly noted that during the period in which each of the user terminals moves towards the best meeting point along the corresponding navigation routes, each of the user terminals reports their moving states and locations to the electronic device 100, such that the electronic device 100 can dynamically adjust the best meeting point and the navigation routes according to the previous planning information in response to unexpected changes occurring to the moving states of each of the user terminals. Accordingly, the operators of the user terminals can move along the dynamically adjusted navigation routes and eventually meet with each other at the best meeting point. In other words, during the period in which each of the user terminals moves, the best meeting point is flexibly changeable according to the moving states of each of the user terminals.

In light of the above, by generating the previous planning information in advance, the electronic device 100 adaptively dynamically adjusts the best meeting point and saves the time for re-calculating the navigation routes. To facilitate understanding, the embodiments below will comprehensively introduce how the previous planning information is generated and how to determine the best meeting point and dynamically adjust the best meeting point according to the previous planning information.

Figure 4:
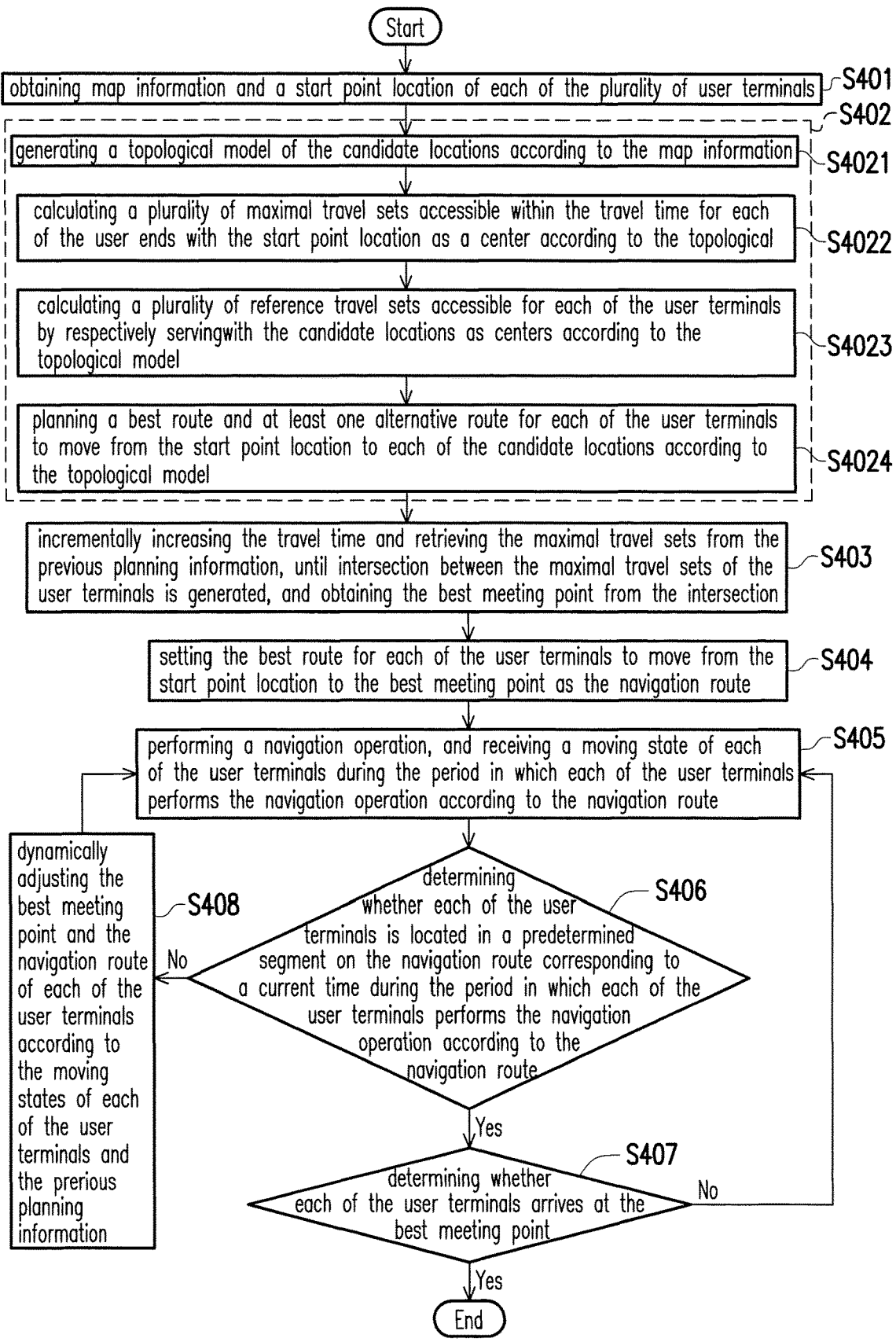
FIG. 4 is a flowchart illustrating a method for planning a meeting point and routes according to an embodiment of the disclosure.

FIG. 4 is a flowchart illustrating a method for planning a meeting point and routes according to an embodiment of the disclosure. Embodiments will be provided below with reference to the components of the electronic device 100 of FIG. 1 to describe the detailed steps of the electronic device 100 executing the method for planning a meeting point and routes.

Referring to both FIG. 1 and FIG. 4, in step S401, the information acquisition module 111 obtains map information and a start point location of each of the plurality of user terminals. In step S402, according to the map information, the planning module 112 generates previous planning information associated with the start point location and a plurality of candidate locations for each of the user terminals. In the present embodiment, step S402 is implemented as sub-step S4021 to sub-step S4024.

First, the planning module 112 generates a topological model of the candidate locations according to the map information (step S4021). The content regarding generating the topological model has been illustrated in FIG. 3 and is not repeated here. It is known that the planning module 112 connects the start point location of each of the user terminals and the candidate locations according to the road information to obtain the topological model. Moreover, according to the moving speeds of the user terminals and the traffic information, the planning module 112 estimates the estimated times required for moving on each of the connecting paths in the topological model. Afterwards, according to the topological model, the planning module 112 calculates a plurality of maximal travel sets accessible within the travel time for each of the user terminals with the start point location as a center (step S4022). In other words, the previous planning information includes the maximal travel sets associated with each of the user terminals.

More specifically, according to the traffic information of the map information and the moving speed of each of the user terminals, the planning module 112 calculates the plurality of maximal travel sets at which each of the user terminals is able to arrive with the start point location as the center within the travel time. Each of the maximal travel sets is a set of the candidate locations at which each of the user terminals is able to arrive within the travel time, and the travel time includes a plurality of time lengths. Taking FIG. 3 as an example, the planning module 112 calculates a plurality of maximal travel sets A(t) associated with the user end u1. When t=0, the maximal travel set A(0)={candidate location A}. When t=1, the maximal travel set A(1)={candidate location A, candidate location B}. When t=2, the maximal travel set A(2)={candidate location A, candidate location B}. When t=3, the maximal travel set A(3)={candidate location A, candidate location B, candidate location C}. When t=5, the maximal travel set A(5)={candidate location A, candidate location B, candidate location C, candidate location E}. Analogously, the plurality of maximal travel sets A(t) associated with the user end u1 and corresponding to different time lengths are generated and recorded.

On the other hand, according to the topological model, the planning module 112 calculates a plurality of reference travel sets accessible for each of the user terminals by respectively serving the candidate locations as centers (step S4023). Each of the reference travel sets is formed by sets of the candidate locations at which each of the user terminals is able to arrive with each of the candidate locations as the centers within the travel time. It is known that the previous planning information includes the reference travel sets associated with each of the user terminals. The method for generating the reference travel sets is similar to the method for generating the maximal travel sets. According to the traffic information of the map information and the moving speed of each of the user terminals, the planning module 112 calculates the plurality of reference travel sets at which each of the user terminals is able to arrive with the plurality of candidate locations as the centers within the travel time. Each of the reference travel sets is a set of the candidate locations at which each of the user terminals is able to arrive within the travel time, and the travel time includes a plurality of time lengths.

Taking FIG. 3 as an example, the planning module 112 calculates a plurality of reference travel sets B(t) at which the user end u1 is able to arrive with the candidate location B as the center. When t=0, the reference travel set B(0)={candidate location B}. When t=1, the reference travel set B(1)={candidate location A, candidate location B}. When t=2, the reference travel set B(2)={candidate location A, candidate location B}. When t=4, the reference travel set B(4)={candidate location A, candidate location B, candidate location C}. When t=6, the reference travel set B(6)={candidate location A, candidate location B, candidate location C, candidate location D}. Analogously, the plurality of reference travel sets B(t) associated with the user end u1 and corresponding to different time lengths are generated and recorded.

Moreover, the planning module 112 calculates a plurality of reference travel sets C(t) at which the user end u1 is able to arrive with the candidate location C as the center. When t=0, the reference travel set C(0)={candidate location C}. When t=1, the reference travel set C(1)={candidate location C}. When t=2, the reference travel set C(2)={candidate location C, candidate location E}. When t=3, the reference travel set C(3)={candidate location A, candidate location C, candidate location D, candidate location E}. When t=4, the reference travel set C(4)={candidate location A, candidate location B, candidate location C, candidate location D, candidate location E}. Analogously, the plurality of reference travel sets C(t) associated with the user end u1 and corresponding to different time lengths are generated and recorded. Similarly, a plurality of reference travel sets D(t), E(t), F(t) with the candidate locations D, E, F as the centers and corresponding to different time lengths are also generated and recorded by the planning module 112.

In addition, according to the topological model, the planning module 112 plans a best route and at least one alternative route for each of the user terminals to move from the start point location to each of the candidate locations (step S4024). In other words, the previous planning information includes the best route and the at least one alternative route for each of the user terminals to move from the start point location to each of the candidate locations. Taking FIG. 3 as an example, based on the creation of the topological model 30, the planning module 112 plans a best route and at least one alternative route for the user end u1 to move from the start point location A to each of the candidate locations. Here, the best route represents the route that takes the least time. For example, if the candidate location E is set as the end point, the planning module 112 plans a best route and at least one alternative route for the user end u1 to move from the start point location A to the candidate location E. Here, the best route is: start point location A→candidate location C→candidate location E (taking 5 time units), and the alternative route may be: start point location A→candidate location B→candidate location C→candidate location E (taking 7 time units). For example, Table 1 shows examples of the best routes and the alternative routes planned for the user end u1 in the previous planning information.

TABLE 1

| Start point | End point | Best route | Alternative route |
|---|---|---|---|
| A | B | A→B | A→C→B |
|  | C | A→C | A→B→C |
|  | D | A→C→D | A→B→D |
|  | E | A→C→E | A→B→C→E |
|  | F | A→C→E→F | A→C→D→F |

However, Table 1 is merely illustrative and is not meant to limit the disclosure.

In addition, the planning module 112 also plans a best route and at least one alternative route for each of the user terminals to move from one candidate location to other candidate locations. Taking FIG. 3 as an example, based on the creation of the topological model 30, the planning module 112 plans a best route and at least one alternative route for the user end u1 to move from the candidate location B to other candidate locations C, D, E, F. For example, Table 2 shows examples of the best routes and the alternative routes planned for the user end u1 in the previous planning information.

TABLE 2

| Start point | End point | Best route | Alternative route |
|---|---|---|---|
| B | C | B→C | B→A→C |
|  | D | B→D | B→C→D |
|  | E | B→C→E | B→A→C→E |
|  | F | B→D→F | B→C→D→F |

However, Table 2 is merely illustrative and is not meant to limit the disclosure. Similarly, the best routes and the alternative routes with the candidate locations C, D, E, F as the start points are also generated and recorded by the planning module 112.

In other words, the previous planning information includes route planning solutions for each of the user terminals with the start point location as the start point and the plurality of candidate locations as the end points. Moreover, the previous planning information further includes route planning solutions for each of the user terminals with any one of the candidate locations as the start point and other candidate locations as the end points.

Returning to FIG. 4, after completing the creation of the previous planning information, the decision module 113 determines a best meeting point for the plurality of user terminals according to the previous planning information. Therefore, in step S403, the decision module 113 incrementally increases the travel time to retrieve the maximal travel sets from the previous planning information, until intersection between the maximal travel sets of the user terminals is generated, and the best meeting point is obtained from the intersection. In step S404, the route providing module 114 sets the best route for each of the user terminals to move from the start point location to the best meeting point as the navigation route.

Figure 5:
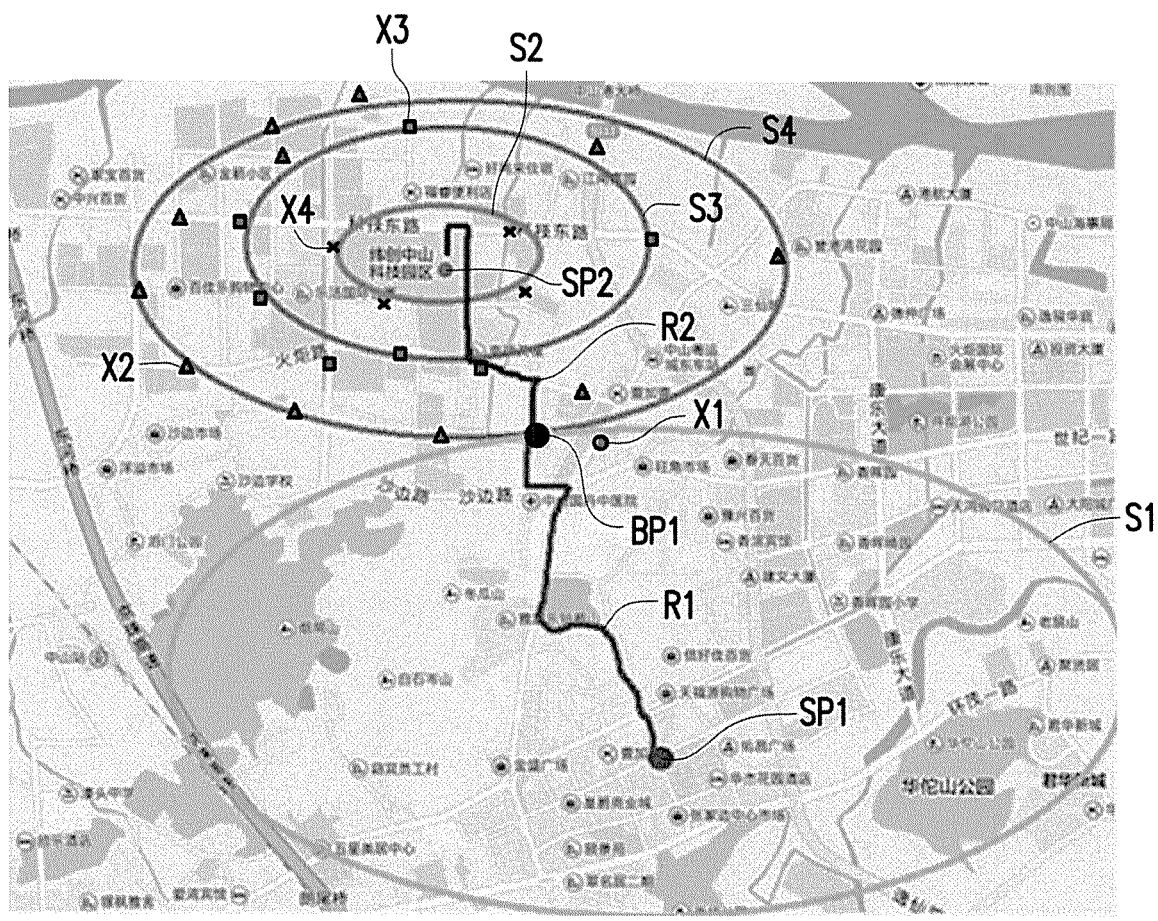
FIG. 5 is a schematic diagram illustrating determining a best meeting point according to an embodiment of the disclosure.

For example, FIG. 5 is a schematic diagram illustrating determining a best meeting point according to an embodiment of the disclosure. Referring to FIG. 5, it is supposed that two user terminals respectively start from start point locations SP1 and SP2. Based on a moving speed of a first user end and the map information, maximal travel sets with the start point location SP1 as the center and corresponding to different time lengths have been calculated. Similarly, based on a moving speed of a second user end and the map information, maximal travel sets with the start point location SP2 as the center and corresponding to different time lengths have also been calculated.

Here, a maximal travel set S1 associated with the first user end and corresponding to one time span is as shown in FIG. 5, and maximal travel sets S2, S3, S4 associated with the second user end and corresponding to three time lengths are as shown in FIG. 5. Each of the maximal travel sets S1, S2, S3, S4 is a set constituted by a plurality of candidate locations. For example, the maximal travel set S1 includes a candidate location X1 and other unillustrated candidate locations. The maximal travel set S4 includes candidate locations X2, X3, X4, other illustrated candidate locations, and other unillustrated candidate locations. The maximal travel set S3 includes the candidate locations X3, X4, other illustrated candidate locations, and other unillustrated candidate locations. The maximal travel set S2 includes the candidate location X4, other illustrated candidate locations, and other unillustrated candidate locations. It follows that the maximal travel sets S2, S3 are subsets of the maximal travel set S4, and the maximal travel set S2 is a subset of the maximal travel set S3.

In light of the above, first, the decision module 113 sets the travel time at 5 minutes and obtains the maximal travel set S2 of the second user end, and discovers that the maximal travel set associated with the first user end and corresponding to 5 minutes does not exist (which means that the second user end is unable to arrive at any candidate location within 5 minutes). Therefore, when the travel time is set at 5 minutes, the maximal travel set S2 of the second user end cannot intersect with any of the maximal travel sets of the first user end. Accordingly, the decision module 113 increases the travel time to 10 minutes and obtains the maximal travel set S3 of the second user end, and discovers that the maximal travel set associated with the first user end and corresponding to 10 minutes does not exist (which means that the second user end is unable to arrive at any candidate location within 10 minutes). Therefore, when the travel time is set at 10 minutes, the maximal travel set S2 of the second user end cannot intersect with any of the maximal travel sets of the first user end.

The decision module 113 repeats the foregoing step of incrementally increasing the travel time and looking for intersection, until intersection between the maximal travel set of the first user end and the maximal travel set of the second user end is generated. As shown in FIG. 5, when the decision module 113 incrementally increases the travel time to 25 minutes and obtains the maximal travel set S1 of the first user end, intersection between the maximal travel set S1 of the first user end and the maximal travel set S4 of the second user end is generated. Accordingly, the decision module 113 can set the candidate location in the intersection between the maximal travel set S1 and the maximal travel set S4 of the second user end as the best meeting point BP1. Afterwards, since the previous planning information already includes the best route of each of the user terminals from the start point location to each of the candidate locations, the route providing module 114 retrieves navigation routes R1, R2 from the previous planning information and assigns the navigation route R1 to the first user end and assigns the navigation route R2 to the second user end.

Returning to FIG. 4, after determining the best meeting point and the navigation route of each of the user terminals, in step S405, each of the user terminals begins to perform a navigation operation, and the information acquisition module 111 receives a moving state of each of the user terminals during the period in which each of the user terminals performs the navigation operation according to the navigation route. The moving state includes a positioned location, a travel direction, and a moving speed of each of the user terminals.

In step S406, during the period in which each of the user terminals performs the navigation operation according to the navigation route, the dynamic adjustment module 115 determines whether each of the user terminals is located in a predetermined segment on the navigation route corresponding to a current time. If the determination of step S406 is affirmative, it means that each of the user terminals is moving towards the best meeting point along the navigation route as expected. If the determination of step S406 is affirmative, proceeding to step S407, the dynamic adjustment module 115 determines whether each of the user terminals arrives at the best meeting point. When each of the user terminals arrives at the best meeting point (i.e., the determination of step S407 is affirmative), ending the procedure after step S407, each of the user terminals meets at the best meeting point. When one of the user terminals has not arrived at the best meeting point (i.e., the determination of step S407 is negative), return to step S405.

On the other hand, if the determination of step S406 is negative, it means that at least one of the user terminals deviates from the navigation route or does not move at an expected moving speed. Accordingly, if the determination of step S406 is negative, proceeding to step S408, according to the moving states of each of the user terminals and the previous planning information, the dynamic adjustment module 115 dynamically adjusts the best meeting point and the navigation route of each of the user terminals. In other words, when at least one of the user terminals deviates from the navigation route or does not move at the expected moving speed, the originally determined best meeting point is no longer suitable, and the dynamic adjustment module 115 will determine a new best meeting point and navigation routes according to the moving states of each of the user terminals and the previous planning information.

In an embodiment, when the first user end among the user terminals leaves the navigation route along a travel direction at a deviation point, the dynamic adjustment module 115 adjusts the reference travel sets of the first user end with the deviation point as the center in the previous planning information according to the travel direction of the first user end. Specifically, since a deviation direction of the first user end is known, part of elements or subsets in the original reference travel sets with the deviation point as the center are removed according to the deviation direction. Afterwards, according to the adjusted reference travel sets and a current location of the other user end (i.e., the second user end) among the user terminals, the dynamic adjustment module 115 updates the best meeting point. Specifically, by looking for intersection between the adjusted reference travel sets and the reference travel sets associated with the second user end and corresponding to the current location of the second user end, a new best meeting point is determined. Next, by setting the updated best meeting point as the end point, the navigation route of each of the user terminals is updated using the previous planning information.

Figure 6A:
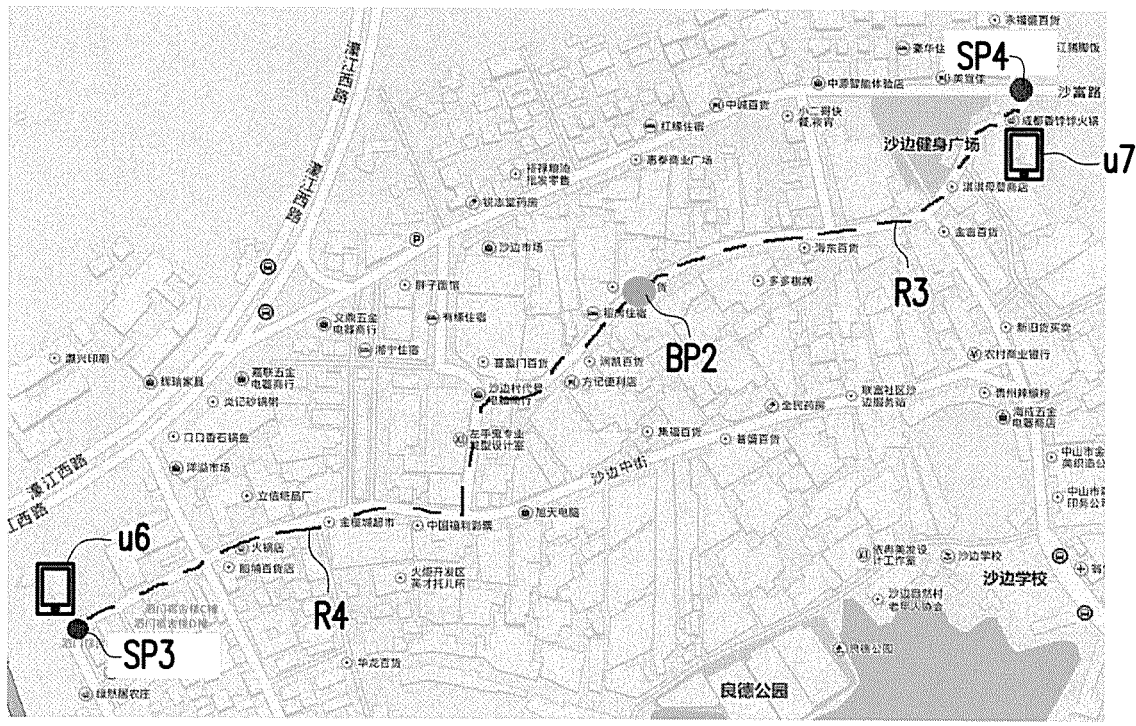
FIG. 6A to FIG. 6B are schematic diagrams illustrating adjusting a best meeting point according to an embodiment of the disclosure.
Figure 6B:
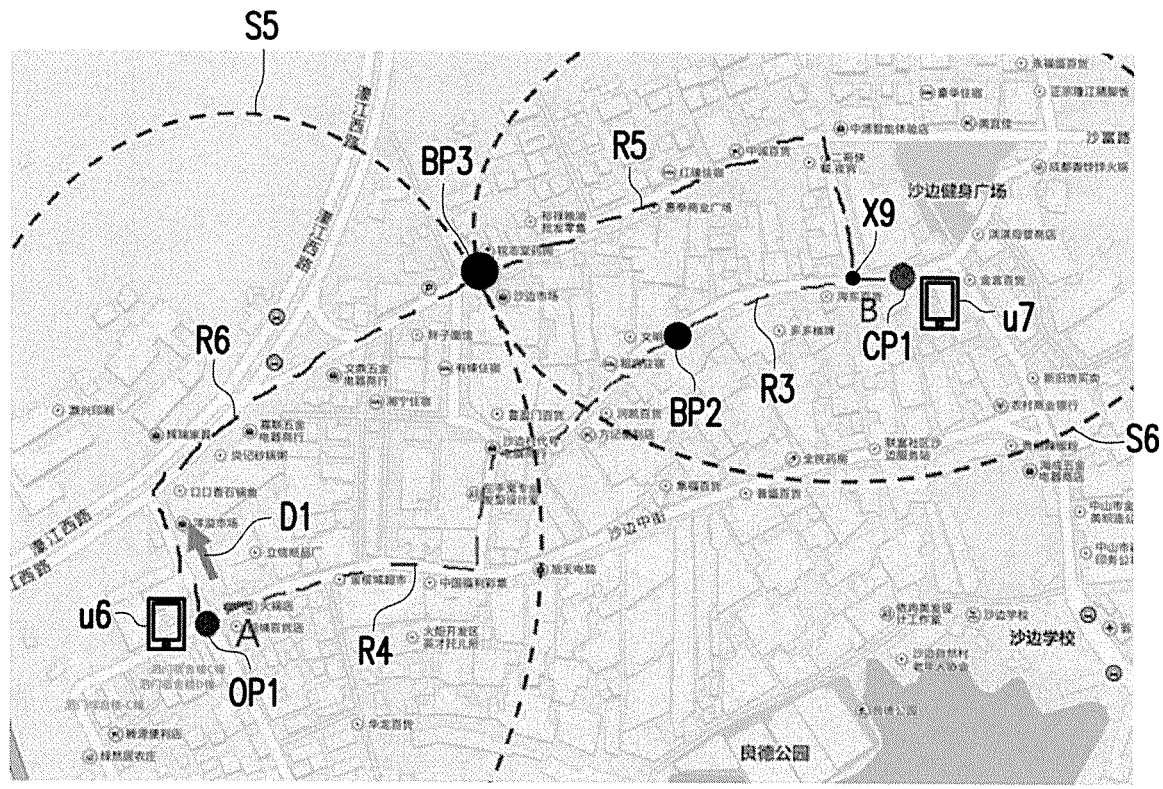

For example, FIG. 6A to FIG. 6B are schematic diagrams illustrating adjusting a best meeting point according to an embodiment of the disclosure. Referring to FIG. 6A, based on the execution of step S401 to step S404, a best meeting point BP2 and navigation routes R3, R4 have been assigned to a first user end u6 and a second user end u7. Afterwards, the first user end u6 and the second user end u7 begin to move respectively from start point locations SP3, SP4, and the first user end u6 and the second user end u7 perform the navigation operation according to the navigation routes R3, R4 and report the moving states to the electronic device 100. Referring to FIG. 6B, when the first user end u6 leaves the navigation route R4 along a travel direction D1 at a deviation point OP1 without moving according to the navigation route R4, the dynamic adjustment module 115 adjusts the reference travel sets of the first user end u6 with the deviation point OP1 as the center in the previous planning information according to the travel direction D1 of the first user end u6. For example, by removing the candidate locations on the navigation route R4 between the deviation point OP1 and the best meeting point BP2 from the plurality of reference travel sets with the deviation point OP1 as the center according to the travel direction D1, the dynamic adjustment module 115 adjusts the plurality of reference travel sets of the first user end u6 with the deviation point OP1 as the center in the previous planning information.

Afterwards, the dynamic adjustment module 115 obtains a plurality of adjusted reference travel sets, e.g., the adjusted reference travel set S5, associated with the first user end u6. In the present example, the dynamic adjustment module 115 is aware of the current location CP1 where the second user end u7 is located and a candidate location X9 closest to the current location CP1. Accordingly, similar to the operation of step S403, by looking for intersection between the adjusted reference travel sets and the reference travel sets of the second user end u7 with the candidate location X9 as the center, the dynamic adjustment module 115 obtains a new best meeting point BP3. As shown in FIG. 6B, the dynamic adjustment module 115 obtains the best meeting point BP3 from the intersection between the adjusted reference travel set S5 and the reference travel set S6. In comparison, without re-planning and re-calculating the routes, the dynamic adjustment module 115 retrieves new navigation routes R5, R6 from the previous planning information according to the deviation point OP1, the candidate location X9, and the best meeting point BP3. The new navigation routes R5, R6 are also used to replace the old navigation routes R3, R4, such that the first user end u6 and the second user end u7 can move according to the navigation routes R5, R6 and meet with each other at the best meeting point BP3.

Alternatively, in an embodiment, when the first user end among the user terminals leaves the navigation route along the travel direction at the deviation point, the dynamic adjustment module 115 obtains at least one alternative route associated with the deviation point from the previous planning information according to the travel direction of the first user end. Afterwards, the dynamic adjustment module 115 sets the at least one alternative route associated with the deviation point as the navigation route of the first user end. In other words, without changing the best meeting point, the dynamic adjustment module 115 may also directly retrieve and use the alternative route in the previous planning information according to the travel direction of the first user end to update the navigation route of the first user end, such that the first user end can move to the unchanged best meeting point according to the new navigation route.

In an embodiment of the disclosure, the foregoing method for planning a meeting point and routes may be implemented as computer-readable codes on a non-volatile computer-readable recording medium. The computer-readable codes include a plurality of commands configured to implement the steps of the foregoing method for planning a meeting point and routes after execution. For example, the computer-readable recording medium is any data storage device that can be read by a computer system, including a read only memory (ROM), a random access memory (RAM), a compact disc read only memory (CD-ROM), a magnetic tape, a floppy disk, an optical data storage device, and carrier waves (such as data transmission through the Internet) but is not limited hereto.

In summary of the above, in the embodiments of the disclosure, by generating the previous planning information, the best meeting point is determined based on the start point locations of each of the user terminals before the navigation function is started. After the navigation function is started, the best meeting point and the navigation routes are dynamically adjusted according to the moving states of the user terminals. Accordingly, once any of the user terminals deviates from the navigation route or does not move at the expected speed, the disclosure is not required to re-calculate and re-plan the routes but adaptively updates the best meeting point and the navigation routes according to the previous planning information, such that the user terminals can meet with each other in a most efficient manner. In other words, compared to the case where the operators of the user terminals determine a fixed meeting point on their own, the decision method of the best meeting point of the disclosure is more flexible and objective, such that the plurality of operators of the user terminals can meet with each other in a most efficient manner. In addition, during the period in which the user terminals move, the road planning solutions are directly retrieved from the previous planning information, and it is not necessary to take additional time for calculation, which enhances the user experience.

Although the disclosure is disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below.

What is claimed is:

1. A method for planning a meeting point and routes, comprising:
    obtaining map information and a start point location of each of a plurality of user terminals;
    generating a topological model of a plurality of candidate locations according to the map information and generating previous planning information associated with the start point location for each of the user terminals according to the topological model and the map information;
    determining a best meeting point for the user terminals according to the previous planning information; and
    dynamically adjusting the best meeting point and a navigation route of at least one of the user terminals according to a moving state of each of the user terminals and a plurality of reference travel sets in the previous planning information, during a period in which at least one of the user terminals performs a navigation operation according to the navigation route,
    wherein the step of generating the previous planning information associated with the start point location and the candidate locations for each of the user terminals according to the topological model and the map information comprises:
    calculating the reference travel sets accessible within the travel time for each of the user terminals respectively with the candidate locations as centers according to the topological model, wherein each of the reference travel sets is a set of the candidate locations at which each of the user terminals is able to arrive within the travel time, and the previous planning information comprises the reference travel sets associated with each of the user terminals.

2. The method for planning a meeting point and routes according to claim 1, further comprising:
    providing the navigation route to at least one of the user terminals based on the best meeting point.

3. The method for planning a meeting point and routes according to claim 2, wherein the step of generating the previous planning information associated with the start point location for each of the user terminals according to the topological model and the map information comprises:
    generating the previous planning information associated with the start point location and the candidate locations for each of the user terminals according to the map information.

4. The method for planning a meeting point and routes according to claim 3, wherein the step of generating the topological model of the plurality of candidate locations according to the map information and generating the previous planning information associated with the start point location and the candidate locations for each of the user terminals according to the topological model and the map information comprises:
    calculating a plurality of maximal travel sets accessible within the travel time for each of the user terminals with the start point location as a center according to the topological model, wherein the previous planning information comprises the maximal travel sets associated with each of the user terminals.

5. The method for planning a meeting point and routes according to claim 4, wherein the step of calculating the maximal travel sets accessible within the travel time for each of the user terminals with the start point location as the center comprises:
    calculating the plurality of maximal travel sets accessible within the travel time for each of the user terminals with the start point location as the center according to traffic information of the map information and a moving speed of each of the user terminals, wherein the travel time comprises a plurality of time lengths, and each of the maximal travel sets is a set of the candidate locations at which each of the user terminals is able to arrive within the travel time.

6. The method for planning a meeting point and routes according to claim 4, wherein the step of determining the best meeting point among the candidate locations for the user terminals according to the previous planning information comprises:
    incrementally increasing the travel time to retrieve the maximal travel sets from the previous planning information, until intersection between the maximal travel sets of the user terminals is generated, and obtaining a best meeting point from the intersection.

7. The method for planning a meeting point and routes according to claim 4, wherein the step of generating the previous planning information associated with the start point location and the candidate locations for each of the user terminals according to the topological model and the map information further comprises:

planning a best route and at least one alternative route for each of the user terminals to move from the start point location to each of the candidate locations according to the topological model, wherein the previous planning information comprises the best route and the at least one alternative route for each of the user terminals to move from the start point location to each of the candidate locations.

8. The method for planning a meeting point and routes according to claim 7, wherein the step of providing the navigation route to at least one of the user terminals based on the best meeting point comprises:

setting the best route for at least one of the user terminals to move from the start point location to the best meeting point as the navigation route, wherein the best meeting point is one of the candidate locations.

9. The method for planning a meeting point and routes according to claim 7, wherein the step of dynamically adjusting the best meeting point and the navigation route according to the moving state of each of the user terminals and the previous planning information, during the period in which at least one of the user terminals performs the navigation operation according to the navigation route comprises:

determining whether each of the user terminals is located in a predetermined segment on the navigation route corresponding to a current time, during the period in which at least one of the user terminals performs the navigation operation according to the navigation route; and dynamically adjusting the best meeting point and the navigation route of at least one of the user terminals according to the moving state of each of the user terminals and the previous planning information, if a first user end among the user terminals is not located in the predetermined segment on the navigation route corresponding to the current time.

10. The method for planning a meeting point and routes according to claim 7, wherein the step of dynamically adjusting the best meeting point and the navigation route of at least one of the user terminals according to the moving state of each of the user terminals and the previous planning information comprises:

adjusting the reference travel sets of the first user end with a deviation point as a center in the previous planning information according to a travel direction of the first user end, when the first user end among the user terminals leaves the navigation route along the travel direction at the deviation point;

updating the best meeting point according to the adjusted reference travel sets and a current location of at least one second user end among the user terminals; and updating the navigation route of at least one of the user terminals via using the previous planning information by setting the updated best meeting point as an end point.

11. The method for planning a meeting point and routes according to claim 7, wherein the step of dynamically adjusting the best meeting point and the navigation route of at least one of the user terminals according to the moving state of each of the user terminals and the previous planning information comprises:

obtaining the at least one alternative route associated with a deviation point from the previous planning information according to a travel direction of a first user end, when the first user end among the user terminals leaves the navigation route along the travel direction at the deviation point; and setting the at least one alternative route associated with the deviation point as the navigation route of the first user end.

12. The method for planning a meeting point and routes according to claim 1, further comprising:

receiving the moving state of each of the user terminals during the period in which at least one of the user terminals performs the navigation operation according to the navigation route, wherein the moving state comprises a positioned location, a travel direction, and a moving speed of each of the user terminals.

13. An electronic device for planning a meeting point and routes, comprising:

a memory, recording a plurality of modules; and
a processor, coupled to a communication device and the memory to access and execute the modules recorded in the memory, and configured to:
obtain map information and a start point location of each of a plurality of user terminals;
generate a topological model of a plurality of candidate locations according to the map information and generate previous planning information associated with the start point location for each of the user terminals according to the topological model and the map information;
determine a best meeting point for the user terminals according to the previous planning information; and
dynamically adjust the best meeting point and a navigation route of at least one of the user terminals according to a moving state of each of the user terminals and a plurality of reference travel sets in the previous planning information, during a period in which at least one of the user terminals performs a navigation operation according to the navigation route,
wherein the processor is further configured to calculate the reference travel sets accessible within the travel time for each of the user terminals respectively with the candidate locations as centers according to the topological model, wherein each of the reference travel sets is a set of the candidate locations at which each of the user terminals is able to arrive within the travel time, and the previous planning information comprises the reference travel sets associated with each of the user terminals.

14. The electronic device for planning a meeting point and routes according to claim 13, wherein the processor is further configured to provide the navigation route to at least one of the user terminals based on the best meeting point.

15. The electronic device for planning a meeting point and routes according to claim 14, wherein the processor is further configured to generate the previous planning information associated with the start point location and the candidate locations for each of the user terminals.

16. The electronic device for planning a meeting point and routes according to claim 15, wherein the processor is further configured to calculate a plurality of maximal travel sets accessible within the travel time for each of the user terminals with the start point location as a center according to the topological model, wherein the previous planning information comprises the maximal travel sets associated with each of the user terminals.

17. The electronic device for planning a meeting point and routes according to claim 16, wherein the processor is further configured to calculate the plurality of maximal travel sets accessible within the travel time for each of the user terminals with the start point location as the center according to traffic information of the map information and a moving speed of each of the user terminals, wherein the travel time comprises a plurality of time lengths, and each of the maximal travel sets is a set of the candidate locations at which each of the user terminals is able to arrive within the travel time.

18. The electronic device for planning a meeting point and routes according to claim 16, wherein the processor is further configured to incrementally increase the travel time to retrieve the maximal travel sets from the previous planning information, until intersection between the maximal travel sets of the user terminals is generated, and obtains a best meeting point from the intersection.

19. The electronic device for planning a meeting point and routes according to claim 16,
wherein the processor is further configured to plan a best route and at least one alternative route for each of the user terminals to move from the start point location to each of the candidate locations according to the topological model, wherein the previous planning information comprises the best route and the at least one alternative route for each of the user terminals to move from the start point location to each of the candidate locations.

20. The electronic device for planning a meeting point and routes according to claim 19, wherein the best route for at least one of the user terminals to move from the start point location to the best meeting point is set as the navigation route, wherein the best meeting point is one of the candidate locations.

21. The electronic device for planning a meeting point and routes according to claim 19, wherein the processor is further configured to determine whether each of the user terminals is located in a predetermined segment on the navigation route corresponding to a current time, during the period in which at least one of the user terminals performs the navigation operation according to the navigation route,
wherein the processor is further configured to dynamically adjust the best meeting point and the navigation route of at least one of the user terminals according to the moving state of each of the user terminals and the previous planning information, if a first user end among the user terminals is not located in the predetermined segment on the navigation route corresponding to the current time.

22. The electronic device for planning a meeting point and routes according to claim 19, wherein the processor is further configured to adjust the reference travel sets of the first user end with a deviation point as the center in the previous planning information according to a travel direction of the first user end, when the first user end among the user terminals leaves the navigation route along the travel direction at the deviation point,
wherein the processor is further configured to update the best meeting point according to the adjusted reference travel sets and a current location of at least one second user end among the user terminals,
wherein the processor is further configured to update the navigation route of at least one of the user terminals via using the previous planning information by setting the updated best meeting point as an end point.

23. The electronic device for planning a meeting point and routes according to claim 19, wherein the processor is further configured to obtain the at least one alternative route associated with a deviation point from the previous planning information according to a travel direction of a first user end and sets the at least one alternative route associated with the deviation point as the navigation route of the first user end, when the first user end among the user terminals leaves the navigation route along the travel direction at the deviation point.

24. The electronic device for planning a meeting point and routes according to claim 13, wherein the processor is further configured to receive a moving state of each of the user terminals during the period in which at least one of the user terminals performs the navigation operation according to the navigation route, wherein the moving state comprises a positioned location, a travel direction, and a moving speed of each of the user terminals.

25. The electronic device for planning a meeting point and routes according to claim 13, further comprising a display device coupled to the processor and displaying the best meeting point and the navigation route.

26. A computer-readable recording medium comprising a plurality of commands configured to execute a method for planning a meeting point and routes, the method comprising the following steps:
obtaining map information and a start point location of each of a plurality of user terminals;
generating a topological model of a plurality of candidate locations according to the map information and generating previous planning information associated with the start point location for each of the user terminals according to the topological model and the map information;
determining a best meeting point for the user terminals according to the previous planning information; and
dynamically adjusting the best meeting point and a navigation route of at least one of the user terminals according to a moving state of each of the user terminals and a plurality of reference travel sets in the previous planning information, during a period in which at least one of the user terminals performs a navigation operation according to the navigation route,
wherein the step of generating the previous planning information associated with the start point location and the candidate locations for each of the user terminals according to the topological model and the map information comprises:
calculating the reference travel sets accessible within the travel time for each of the user terminals respectively with the candidate locations as centers according to the topological model, wherein each of the reference travel sets is a set of the candidate locations at which each of the user terminals is able to arrive within the travel time, and the previous planning information comprises the reference travel sets associated with each of the user terminals.

* * * * *